(12) United States Patent
Nagahara

(10) Patent No.: US 6,433,969 B1
(45) Date of Patent: Aug. 13, 2002

(54) COMPOUND MAGNETORESISTIVE HEAD AND METHOD FOR MANUFACTURING SAME

(75) Inventor: Kiyokazu Nagahara, Tokyo (JP)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 09/580,452

(22) Filed: May 30, 2000

(30) Foreign Application Priority Data

May 31, 1999 (JP) ............................................ 11-152591

(51) Int. Cl.[7] ................................................. G11B 5/39
(52) U.S. Cl. ....................................................... 360/317
(58) Field of Search ................................. 360/317, 126, 360/125, 119

(56) References Cited

U.S. PATENT DOCUMENTS

| | | | |
|---|---|---|---|
| 5,617,277 A | * 4/1997 | Chen et al. | 360/126 |
| 5,761,011 A | * 6/1998 | Miyauchi et al. | 360/319 |
| 5,809,636 A | * 9/1998 | Shouji et al. | 29/603.14 |
| 5,912,790 A | * 6/1999 | Yoda et al. | 360/122 |
| 6,134,079 A | * 10/2000 | Koshikawa | 360/126 |
| 6,151,193 A | * 11/2000 | Terunuma et al. | 360/119 |
| 6,278,590 B1 | * 8/2001 | Gill et al. | 360/126 |

FOREIGN PATENT DOCUMENTS

| | | |
|---|---|---|
| JP | 7-57223 | 3/1995 |
| JP | 9-116209 | 5/1997 |
| JP | 9-198624 | 7/1997 |
| JP | 2710210 | 10/1997 |

OTHER PUBLICATIONS

"A Magnetoresistivity Readout Transducer", IEEE Trans. on Magnetics, MAG-7 (1970) pp. 150-154.

* cited by examiner

Primary Examiner—David L. Ometz
(74) Attorney, Agent, or Firm—McGinn & Gibb, PLLC

(57) ABSTRACT

A compound magnetoresistive effect head has a dedicated playback head formed by a magnetoresistive effect element disposed between magnetic shields, with a magnetic gap therebetween, and a dedicated recording head having a function of performing recording by a magnetic field generated in a gap provided between magnetic poles. An electrode film for the purpose of causing a current to flow in a ferromagnetic film and a magnetoresistive effect film for stabilizing magnetization of the magnetoresistive effect film is formed so as to be magnetically and electrically connected to both ends of the magnetoresistive effect film, and a flattening film is provided between the first and second magnetic separation films in the magnetoresistive effect element height direction of the playback head.

2 Claims, 5 Drawing Sheets

US 6,433,969 B1

COMPOUND MAGNETORESISTIVE HEAD AND METHOD FOR MANUFACTURING SAME

BACKGROUND OF THE INVENTION

1. Field of the Invention

The present invention relates to a compound thin-film magnetic head formed as a laminate of a playback head using a magnetoresistive effect and a recording head using a magneto-inductive effect, and to a method for manufacturing such a compound head, and more particularly to a thin-film compound magnetoresistive effect head in which it is possible to achieve sufficient insulation between magnetic shields.

2. Description of the Related Arts

In the past, compound magnetoresistive effect heads have been widely used in the writing and reading of information with respect to a magnetic recording medium.

Because of a reduction in the relative velocity between the magnetic head and the magnetic recording medium that has accompanied a reduction in size and increase in capacity of magnetic recording media, magnetoresistive effect heads (hereinafter abbreviated MR heads), in which the playback output is not dependent upon the speed, have gained attention in recent years.

MR heads are discussed in "A Magnetoresistivity Readout Transducer," IEEE Trans. on Magnetics MAG-7 (1970), 150.

The most practical MR head, as shown in FIG. 6, is a compound magnetoresistive effect head formed by an MR head having two opposing magnetic shield films S1 and S2, and a magnetoresistive effect (MR) element 8 provided between the magnetic shield films S1 and S2 with intervening magnetic gap layers 3 and 4, i.e., magnetic separation layers made of insulation films, therebetween, and an inductive head (hereinafter abbreviated ID head) formed by one of the magnetic shield S2 of the opposing magnetic shields S1 and S2 as one magnetic pole film P1 and, on a surface of the magnetic pole film P1 opposite from the magnetoresistive effect element 8, a coil 90 held between an insulator and another magnetic pole film P2, these being laminated in parallel with the magnetic pole film P1, magnetic recording being performed by a magnetic field generated in a magnetic gap 95 provided between the magnetic pole films P1 and P2.

FIG. 2 shows a plan view of the above-noted compound magnetoresistive effect head, viewed from the magnetic recording medium surface (air bearing surface; ABS surface).

In an MR head, because the playback track width becomes narrow with an increase in the recording density, a head was disclosed in Japanese Unexamined Patent Publication (KOKAI) No.7-57223, wherein to suppress the side fringe effect a magnetoresistive effect element is disposed only in the playback track part, a ferromagnetic film (hereinafter referred to as a magnetization stabilizer film) for the purpose of stabilizing the magnetization of the magnetoresistive effect element is disposed adjacent to the magnetoresistive effect element.

The above-noted magnetization stabilizer film is used for the purpose of stabilizing the magnetization of the magnetoresistive effect film used as a magnetoresistive effect element in one direction, thickness of this magnetization stabilizer film being determined by the saturation magnetization and thickness of the magnetoresistive effect film.

The dimension of the magnetoresistive effect element in the direction perpendicular to the medium surface (hereinafter referred to as the element height) is made small so as to correspond to the playback track width, and the magnetoresistive effect element is substantially square in shape.

The improvement of recording density is accompanied by a reduction in both the playback track width and the linear recording width.

The linear recording density is dependent upon the spacing between the magnetic shields S1 and S2 (hereinafter referred to as the playback gap).

With a narrowing of the playback gap, there is a reduction of the thickness of the magnetic separation film, which is an insulation film, between the magnetoresistive effect element and the magnetic shields.

In the past, in one method of establishing the element height, ion milling or the like was generally used to perform patterning to an approximate height, after which lapping was performed to establish the final element height.

When the above is done, in performing patterning by ion milling or the like, a step occurs at the etched part.

For this reason, in the past by forming a magnetic separation layer made of an insulation film before forming the magnetic shield S2, this step was covered, thereby preventing an electrical short circuit between the magnetoresistive effect element and the magnetic shield S2.

However, with an increase in the recording density, the magnetic separation layer thickness is decreased, making it difficult to completely cover the step part, so that it is not possible to maintain insulation between the magnetic shield S2 and the magnetoresistive effect element.

The problems accompanying prior art are described below, with reference being made to FIG. 6.

Specifically, FIG. 6 is a cross-section view of a known compound magnetoresistive effect head (MR head) of the seen in the direction of the cutting line A—A shown in FIG. 2 and in the direction of right angle to a paper surface of this FIG. 6.

As one of structures of the magnetoresistive effect element 8 in the above-noted MR head, a surface 50, not in opposition to the recording medium and having a prescribed element height, is established by being patterned with ion milling or the like.

The magnetoresistive effect film (MR film) 5 generally is made of an NiFe film, and a soft magnetic layer is further laminated for applying a vertical bias to the magnetic separation layers G1 and G2 as well as the magnetoresistive effect film 8.

In the case of a spin valve film, the structure is one in which a magnetization fixing layer, a magnetization free layer, and a copper film or the like are laminated.

In either case, the total thickness of the magnetoresistive effect element is approximately 50 nm. By etching the magnetoresistive effect element in the process that performs patterning so as to establish the element height, a step approximately the size of the film thickness of the magnetoresistive effect element is formed.

The resolution of the playback head in the linear density direction is dependent upon the playback gap length, and to achieve high-density recording and playback, it is necessary to make the playback gap length short.

The magnetoresistive effect element 8 is disposed between the lower magnetic shield S1 and the upper magnetic shield S2, and to prevent the current flowing in the magnetoresistive effect element 8 from being divided by the magnetic shields S1 and S2 it is necessary to provide electrical insulation between the magnetic shields S1 and S2.

For this reason, insulation films are provided between the magnetic shield S1 and the magnetoresistive effect element 8 and between the magnetic shield S2 and the magnetoresistive effect element 8.

Note that, a lower magnetic gap G1 is provided between the lower magnetic shield S1 and the magnetoresistive effect element 8, while the upper magnetic gap G2 is provided between the upper magnetic shield S2 and the magnetoresistive effect element 8, so as to serve as insulation films therebetween.

Thus, with an increase in the linear density, the film thickness of these insulation films inevitably becomes smaller.

For this reason, because of the insulation films laminated between the magnetic shields and the magnetoresistive effect element, it is difficult to completely cover the step that is formed by the step of patterning the magnetoresistive effect element so as to establish the prescribed element height, the result being the risk that it will not be possible to maintain the insulation between the magnetic shields and the magnetoresistive effect element.

More specifically, in a conventional MR head as shown in FIG. 6, by restricting one of the heights of the magnetoresistive effect element by performing patterning with ion milling or the like, a step 60 occurs at the edge part of the magnetoresistive effect element, and thus the magnetic gap G2 formed by a film of $Al_2O_3$ or the like laminated for the purpose of establishing insulation between the magnetoresistive effect element and the magnetic shield S2 is formed so as to cover this step.

Accompanying an increase in the recording and playback density, however, the spacing between the magnetic shields S1 and S2 (the playback gap) becomes small.

Therefore, the thickness of the magnetic gap layer G2 laminated between the magnetoresistive effect element 8 and the magnetic shield S2 also becomes thin.

The reduction in the thickness of the magnetic gap layer G2 causes a reduction in the magnetic gap G2 covering the step occurring when the magnetoresistive effect element is patterned, thereby worsening the coverage of the step.

As a result, the quality of the insulation between the magnetoresistive effect element 8 and the magnetic shield S2 is worsened, and in an extreme case, an electrical short circuit could occur between the magnetoresistive effect element 8 and the magnetic shield S2.

An example of a method for manufacturing the above-noted compound magnetoresistive effect head of the past is described below, with reference to FIG. 5.

Specifically, FIG. 5(A) is a drawing showing the magnetoresistive effect element 8 and the edge electrode from the same direction as in FIG. 6.

Although not shown in FIG. 5, as can be understood from FIG. 2, the magnetoresistive effect element 8 is formed only in the track part of the MR head, with electrodes being formed so as to be connected to each end thereof.

To form this shape, a magnetoresistive effect film 8 is first grown, after which, as shown in FIG. 5(B), photoresist 16 is formed in a stencil pattern.

Next, as shown in FIG. 5(C), using the photoresist pattern 16 as a mask, etching is done of the magnetoresistive effect film 8 by ion milling, after which a CoCrPt film 11 for application of vertical bias to the magnetoresistive effect film 8 and Au film 12 for the purpose of causing current to flow in the magnetoresistive effect film 8 are sputtered, with the photoresist pattern remaining, after which the photoresist is lifted off.

The magnetoresistive effect film 8 is formed using an RF magnetron sputtering apparatus.

The argon gas pressure when forming the above-noted film is 0.3 Pa, and the RF power is 200 W. Because the photoresist is formed as a stencil, a two-layer resist is used.

The first layer of resist uses a PMGI film that is soluble in an alkaline developer, and the second layer uses a Novolac positive resist.

The accelerating potential used for ion milling of the magnetoresistive effect film 8 is 500 V, and the ion current density is 1.0 $mA/cm^2$.

Sputtering of the CoCrPt film and the Au film was also done using an RF magnetron sputtering apparatus.

Figure 5A:
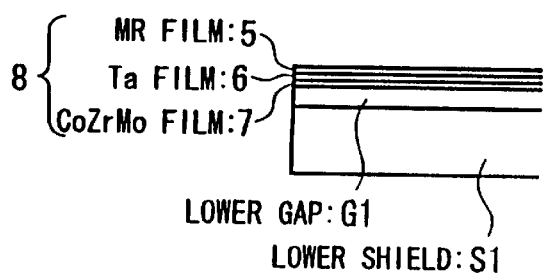
FIG. 5(B) shows the formation of the photoresist pattern 16 for establishing one side of the element height, this being formed as a single-layer resist.
FIG. 5(C) is a drawing showing the etching by ion milling, using the photoresist formed as shown in FIG. 5(B), of the magnetoresistive effect film and the CoCrPt film 11 and Au film 12 formed on both ends thereof.
Figure 5C:
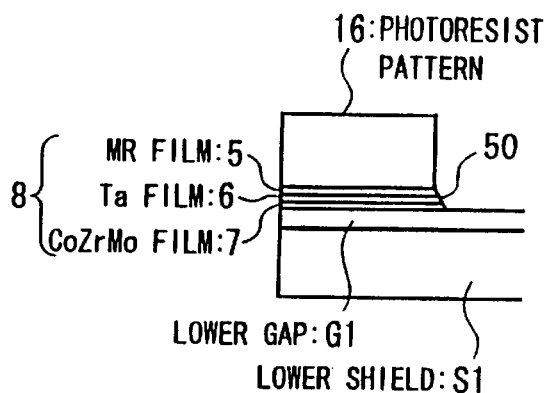
Figure 5B:
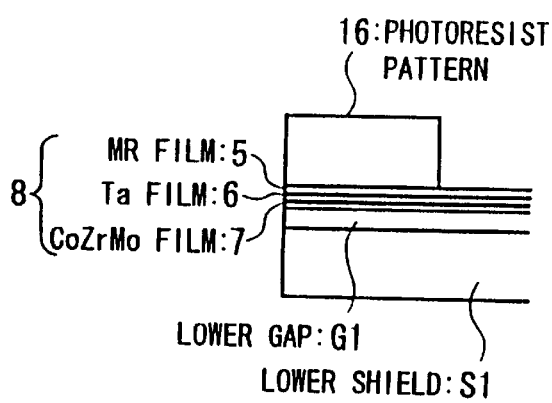

The ion milling in FIG. 5(C) is performed with an accelerating potential of 500 V and a ion current density of 1.0 $mA/cm^2$.

The angle of incidence of the ion beam when performing ion milling is 10 degrees, and the milling time was approximately 5 minutes.

The cross-sectional shape of the wall part 50 of the end parts of the magnetoresistive effect element 8 after etching have a taper angle of approximately 65 degrees.

Figure 5D:
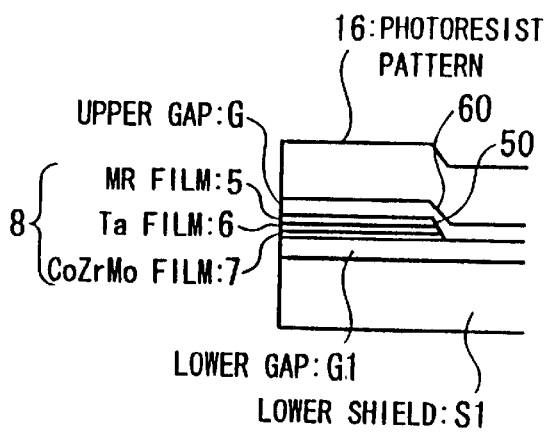

FIG. 5(D) shows the condition after etching, subsequent removal of the photoresist, and the growth of the upper gap G2 film of $Al_2O_3$, and then the formation of the upper magnetic shield S2.

The formation of the upper gap G2 is done using an RF magnetron sputtering apparatus, with an argon gas pressure of 0.077 Pa, an RF power of 2 kW, and an $Al_2O_3$ film thickness of 30 nm.

Because flattening was not done in MR heads of the past, the step 60 occurring during etching of the magnetoresistive effect element 8 remained as is.

In this condition, if upper gap G2 of $Al_2O_3$ film is formed and then the upper shield S2 is formed, as shown in FIG. 5(D) the distance between the magnetoresistive effect element 8 and the upper shield S2 is reduced at the step part 60.

With the achievement of high linear density in MR heads, with a reduction of the playback gap the thickness of the $Al_2O_3$ film forming the upper gap G2 is also reduced, making it very difficult to establish insulation between the magnetoresistive effect element and the upper shield.

In the Japanese Unexamined Patent Publication (KOKAI) No. 9-198624, there is language with regard to the configuration of a compound magnetic head, this disclosure being of the use of a configuration for solving the problem of a step formed in magnetic recording head.

Thus, while there is disclosure of technology for formation of a step-removing layer having a thickness that is the same as the upper shield for the purpose of removing problem of the step of the upper shield, there is no language disclosing technology for solving the problem of a step formed because of the magnetoresistive effect element in a magnetic playback head.

In the Japanese Unexamined Patent Publication (KOKAI) No. 9-116209, there is language with regard to a structure of a magnetoresistive effect element, and in particular for the purpose of improving the flatness in a recording head, to which purpose one of the first and second magnetic layers is formed within a magnetic field detection region, thereby being no language with regard to technology for solving the problem of a step in the magnetoresistive effect element of a magnetic playback head.

Additionally, in the patent diode disclosure No. 2710210, there is language with regard to a magnetic resistive readout transducer, in which a configuration for minimizing the electrical instability in the junction part between an MR layer and a magnetic bias layer. However, there is no language with regard to technology for solving the problem of a step occurring in a magnetoresistive effect element of a magnetic playback head.

Accordingly, in order to improve on the above-noted drawbacks of the prior art, it is an object of the present invention to provide a compound magnetoresistive effect head and method for manufacturing a compound magnetoresistive effect head that achieves a high recording density.

SUMMARY OF THE INVENTION

In order to achieve the above-noted object, the present invention has the following technical constitution.

Specifically, a first aspect of the present invention is a compound magnetoresistive effect head comprising a dedicated playback head comprising opposing first and second magnetic shield films, a magnetoresistive effect element provided between the first and second magnetic shield films and through a first magnetic separation layer and second magnetic separation layer each provided between the first magnetic shield film and the magnetoresistive effect element and between the second magnetic shield film and the magnetoresistive effect element, respectively, and a recording head configured so as to use one of the two opposing magnetic shield films as a first magnetic pole film, and, on a surface of the first magnetic pole film opposite to the magnetoresistive effect element, a coil sandwiched by insulators and a second magnetic pole film, these being laminated thereon, in parallel with the first magnetic pole film, recording being performed by a magnetic field generated in a magnetic gap provided between the first and second magnetic pole films, wherein in the compound magnetoresistive effect head, a ferromagnetic film for stabilizing magnetization of the magnetoresistive effect film and an electrode film for the purpose of causing a current to flow in a magnetoresistive effect film are arranged at both ends of the magnetoresistive effect film, so as to be magnetically and electrically connected thereto, and further wherein the a flattening film being provided between the first and second magnetic separation films in a direction of a height of the magnetoresistive effect element of the playback head.

A second aspect of the present invention is a method for manufacturing a compound magnetoresistive effect head having a dedicated playback head comprising opposing first and second magnetic shield films, a magnetoresistive effect element provided between the first and second magnetic shield films and through a first magnetic separation layer and second magnetic separation layer each provided between the first magnetic shield film and the magnetoresistive effect element and between the second magnetic shield film and the magnetoresistive effect element, respectively; and a recording head configured so as to use one of the two opposing magnetic shield films as a first magnetic pole film, and, on a surface of the first magnetic pole film opposite to the magnetoresistive effect element, a coil sandwiched by insulators and a second magnetic pole film, these being laminated thereon, in parallel with the first magnetic pole film, recording being performed by a magnetic field generated in a magnetic gap provided between the first and second magnetic pole films, wherein in the compound magnetoresistive effect head, a ferromagnetic film for stabilizing magnetization of the magnetoresistive effect film and an electrode film for the purpose of causing a current to flow in a magnetoresistive effect film are arranged at both ends of the magnetoresistive effect film, so as to be magnetically and electrically connected thereto, the method comprising, a first step of forming a first magnetic shield layer, a second step of forming a first magnetic separation layer on the first magnetic shield layer, a third step of forming a magnetoresistive effect film on the first magnetic separation layer, a fourth step of patterning the magnetoresistive effect element film to a prescribed shape, a fifth step of forming a flattening layer having a thickness substantially the same as the magnetoresistive effect element film on the first magnetic separation layer from which the magnetoresistive effect element film is removed, so as to join with the patterned magnetoresistive effect element film, and a sixth step of forming a second magnetic separation layer on the surface of the magnetoresistive effect element film and the flattening film.

By adopting the above-described constitutions, in a compound magnetoresistive effect head formed by lamination of an MR playback head and an ID recording head, and method for manufacturing such a compound magnetoresistive effect head according to the present invention, by flattening a step formed by patterning so as to establish the magnetoresistive effect element height, it is possible to form a thin $Al_2O_3$ film between the magnetoresistive effect element and the magnetic shield, thereby achieving a compound head having an MR head with a thin-film playback gap length.

BRIEF DESCRIPTIONS OF THE DRAWINGS

Figure 1:
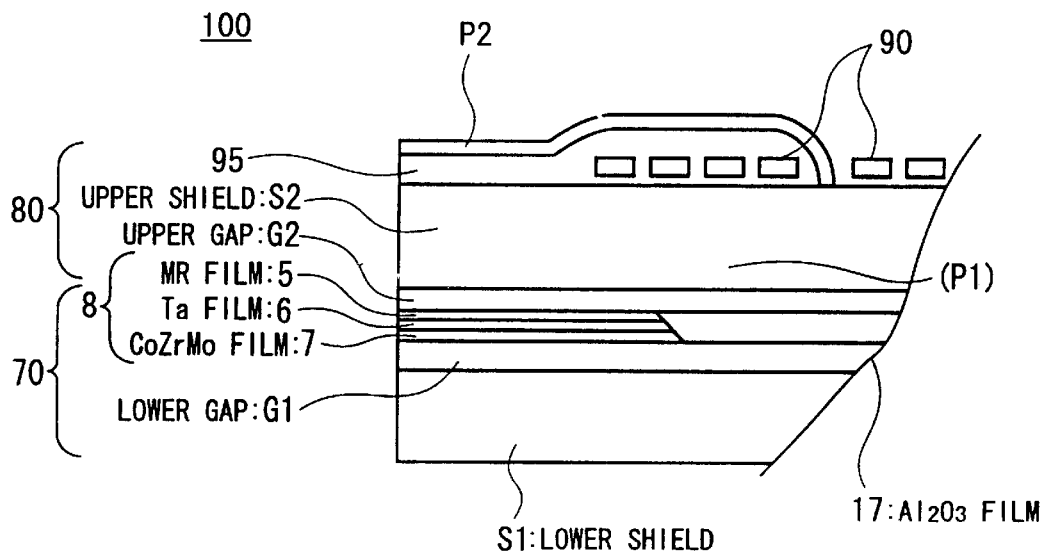

FIG. 1 is a cross-section view showing the configuration of an embodiment of a compound magnetoresistive effect head according to the present invention.

Figure 2:
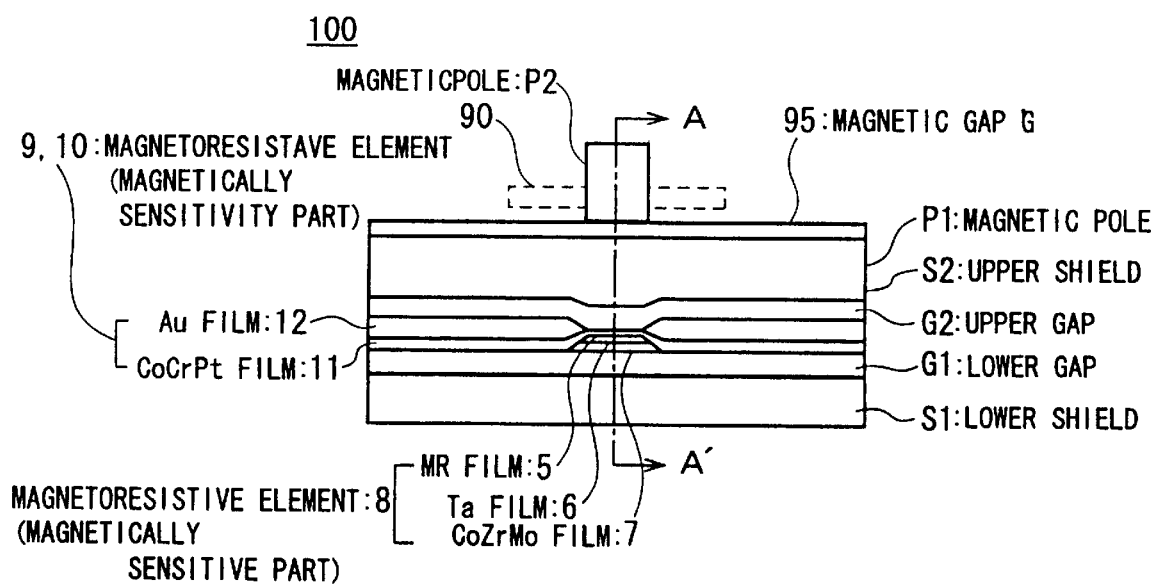

FIG. 2 is a plan view of an embodiment of a compound magnetoresistive effect head according to the present invention, viewed from the air bearing surface of the compound head.

FIG. 3 is a cross-section view of the main parts the manufacturing processes according to an embodiment of compound magnetoresistive effect head according to the present invention.

Figure 4:
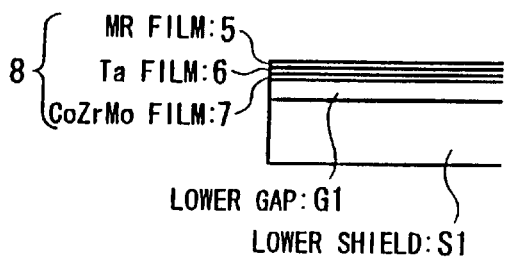
Figure 4:
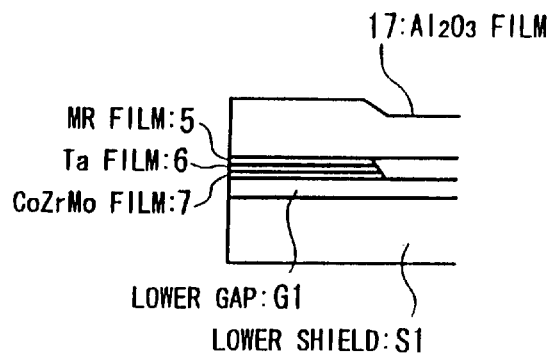
Figure 4:
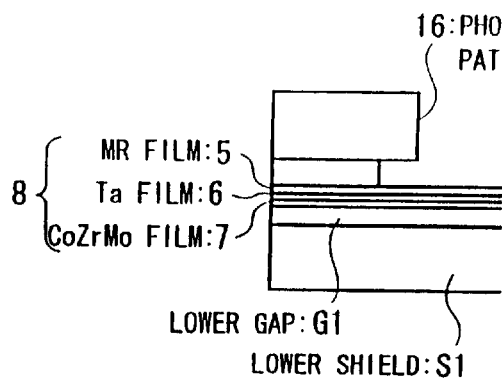
Figure 4:
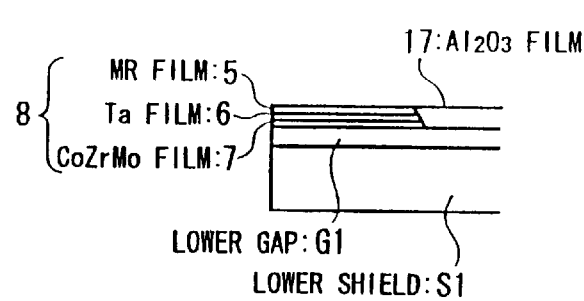
Figure 4:
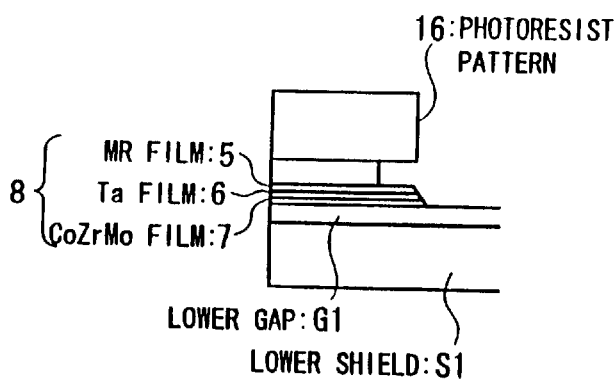

FIG. 4 is a cross-section view of the main parts the manufacturing processes according to another embodiment of compound magnetoresistive effect head according to the present invention FIG. 5 is drawing showing an example of a method of manufacturing a compound magnetoresistive effect head/inductive head of the past.

Figure 6:
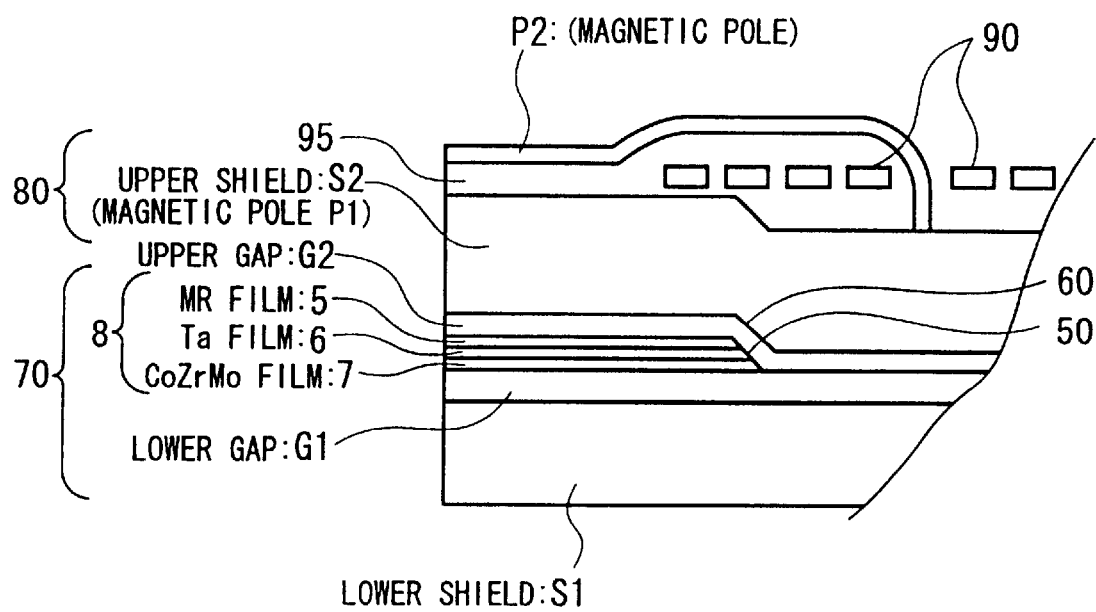

FIG. 6 is a simplified drawing showing the configuration of a compound magnetoresistive effect head/inductive head of the past.

DETAILED DESCRIPTION OF THE PREFERRED EMBODIMENTS

Preferred embodiments a compound magnetoresistive effect head and a method for manufacturing a compound magnetoresistive effect head according to the present invention are described in detail below, with references being made to relevant accompanying drawings.

Specifically, FIG. 1 is a cross-section view showing an example of the configuration of a compound magnetoresistive effect head according to the present invention.

This drawing shows a compound magnetoresistive effect head 100 comprising a dedicated playback head 70 formed by opposing first and second magnetic shields S1 and S2, and a magnetoresistive effect element 8 between first and second magnetic shields S1 and S2 with first and second magnetic separation layers G1 and G2 existing therebetween, respectively, and a dedicated magnetoresistive effect recording head 80, which forming a recording magnetic head, so-called an inductive recording head (ID head), which being configured so as to use one of the two opposing magnetic shields S1 and S2, for example, magnetic shields S2 being commonly used as a first magnetic pole film P1, and having, on a surface of the first magnetic pole film P1 being opposite to the magnetoresistive effect element 8, a coil 90 held within an insulator and a second magnetic pole film P2, these being laminated in parallel with the first magnetic pole film P1, recording being performed by a magnetic field generated in a magnetic gap 95 provided between the first and second magnetic pole films P1 and P2, and wherein the compound magnetoresistive effect head further comprising an electrode film 12 for the purpose of causing a current to flow in a ferromagnetic film 11 and the magnetoresistive effect film 8 for stabilizing magnetization of the magnetoresistive effect film 8 is formed at both ends of the magnetoresistive effect film 8 so as to be magnetically and electrically connected to both ends of the magnetoresistive effect film 8, and a flattening film 17 being provided between the first and second magnetic separation films Gi and G2 in the magnetoresistive effect element height direction of the playback head 70.

The present invention is a compound magnetoresistive effect head 100 having an MR head 70 with a playback function, formed by a magnetoresistive effect element 8 which being provided between two opposing magnetic shield films S1 and S2 interposing a magnetic separation films G1 and G2 therebetween, respectively, and an inductive type recording head 80 that uses the magnetic shield S2 of the two magnetic shields S1 and S2 as one magnetic pole film P1, and having, on a surface of this magnetic pole film P1 opposite from the magnetoresistive effect element 8, a coil 90 held within an insulator and another magnetic pole film P2, these being laminated in parallel with magnetic pole film P1, whereby recording being performed by a magnetic field generated in a magnetic gap G provided between the magnetic poles P1 and P2, and wherein in the MR head 70, in which the magnetoresistive effect element 8 is patterned by ion milling or the like as a means for establishing at least the dimension of the magnetoresistive effect element 8 of the MR head 70 in one direction perpendicular to the surface of the medium, when etching the magnetoresistive effect element 8, by flattening the step 60 that occurs at the edge part 50 of the magnetoresistive effect element 8, the step 60 occurring between the magnetoresistive effect element 8 and the magnetic shield S2 is eliminated, thereby making it possible to make the insulation film thinner than at present, enabling the achievement of a compound magnetoresistive effect head with a narrow gap playback head.

Thus, in the present invention, in contrast to the prior art described above, in the process step that establishes the element height of the magnetoresistive effect element, by flattening the step that occurs with patterning by ion milling or the like, even if a thickness of the magnetic gap G2 between the magnetoresistive effect element and the magnetic shield S2 becomes thin, there is no loss of coverage with the formation process, so that even if the playback gap becomes smaller with an improvement in recording and playback density, it is possible to achieve a compound magnetoresistive effect head in which the insulation between the magnetoresistive effect element and the magnetic shield S2 is sustained.

It is desirable that the flattening layer 17 used in the compound magnetoresistive effect head according to the present invention have a thickness that is substantially the same as the magnetoresistive effect element 8.

It is also desirable that one end part of the flattening layer 17 according to the present invention be in mutual contact with one end part of the magnetoresistive effect element 8.

Additionally, it is preferable that the step 60 at the joint between the flattening layer 17 and the magnetoresistive effect element 8 be 30 nm or smaller.

It is preferable that, in a compound magnetoresistive effect head according to the present invention, at least the surface of the magnetic separation layer, that is, of the upper gap G2 provided on the coil side of the magnetoresistive effect element 8, is formed in substantially flat.

It is also preferable that, in a compound magnetoresistive effect head 100 according to the present invention, on a surface of the upper magnetic shield S2, i.e., the magnetic shield opposing the magnetic pole film P1 provided with the coil 90 or the magnetic shield that commonly serves also as the magnetic pole film P1, there is no step.

A method of manufacturing a compound magnetoresistive effect head according to the present invention is described in further detail below, in terms of an embodiment thereof.

A feature of the compound magnetoresistive effect head 100 according to the present invention is that, in the process that establishes the element height, as shown in FIG. 1, the step occurring during patterning is flattened, thereby eliminating the step between the magnetoresistive effect element 8 and the magnetic shield S2, making it possible to make the magnetic gap G2 formed in a lamination between the magnetoresistive effect element 8 and the magnetic shield S2, thin, thereby providing a compound magnetoresistive effect head having a small playback gap.

FIG. 2 shows a plan view of the compound magnetoresistive effect head 100 as seen from the air bearing surface.

As shown in FIG. 2, this magnetoresistive effect head is a compound head formed by an MR head 70 serving as a playback head and an inductive head 80 serving as a recording head.

In FIG. 2, S1 and S2 are magnetic shields of the MR head 70, S1 being the lower shield, and S2 being the upper shield.

The shields are formed of an NiFe alloy (Permalloy), the film thicknesses being 1 $\mu$m for the lower shield S1 and 3 $\mu$m for the upper shield S2.

Between the upper and lower shields is formed an MR element made up of a magnetoresistive effect element 8 serving as a magnetically sensitive part and end regions 9 and 10 having the function of supplying current and a vertical bias to the magnetoresistive effect element 8.

The magnetoresistive effect element 8 is formed by a NiFe film 5 having magnetoresistive effect and a thickness of 10 nm, a CoZrMo film 7 having a thickness of 15 nm for the purpose of applying a horizontal bias to the NiFe film 5, and a Ta film 6 having a thickness of 10 nm for the purpose of magnetically separating the NiFe film 5 and the CoZrMo film 7, these being laminated in the sequence of CoZrMo film 7, followed by the Ta film 6, and finally the NiFe film 5 from a side of an upper surface of the lower shield.

The width (MR head track width) of the magnetoresistive effect element 8 is 1.0 μm. The end regions are electrically joined to the magnetoresistive effect element, and are formed by a CoCrPt film 11 for applying vertical bias to the NiFe film 5 of the magnetoresistive effect element 8, and an Au film 12 for supplying a current to the magnetoresistive effect element 8.

The thickness of the CoCrPt film 11 is 25 nm.

The above-noted MR element formed by a magnetoresistive effect element and end regions is electrically insulated from the upper and lower shields by $Al_2O_3$ films G1 and G2.

Note that the G1 and G2 are the lower and upper gaps, respectively. The thickness of the $Al_2O_3$ film is 50 nm for the lower gap G1 and 30 nm for the upper gap G2.

On the upper shield S2 is formed an NiFe magnetic pole P1, magnetically continuous with the upper shield S2 and well aligned with the magnetoresistive effect 8. The magnetic pole P1 and upper shield S2 form one magnetic pole of the ID recording head, with the other magnetic pole P2 being formed by another NiFe film 5, with interposing a magnetic gap G made of alumina, therebetween.

When this is done, the widths of both the magnetic pole P1 and the magnetic pole P2 are 1.1 μm, the film thicknesses thereof are 3.5 μm and 0.5 μm, respectively, and a film thickness of the magnetic gap 95 is 0.25 μm.

On the other hand, a position being 2 μm to the rear from the ABS surface of the magnetic poles P1 and P2 is formed a coil 90 of copper, insulated by photoresist, and by causing current to flow in this coil, a recording magnetic field is generated in the magnetic gap 95.

The method for manufacturing the above-noted compound head 100 according to the present invention is described below, with reference being made to FIG. 3, which illustrates the manufacturing process steps as seen in a vertical cross-section view of the MR head.

Figure 3A:
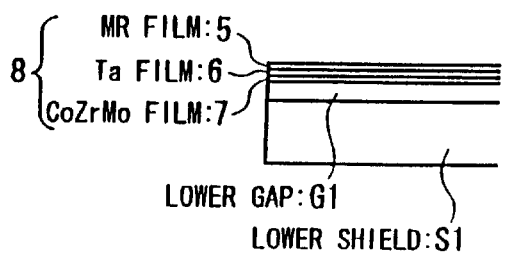

FIG. 3(A) shows a configuration in that the magnetoresistive effect element and the end electrode are formed.

Although not shown in the drawing, the magnetoresistive effect element 8 is formed only on the track part of the MR head, with electrodes being formed so as to be connected to each end thereof.

Figure 3B:
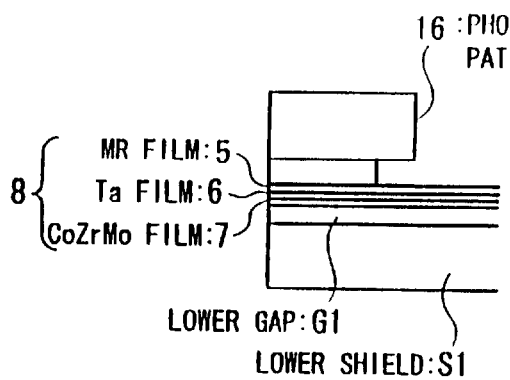

To form this shape, a magnetoresistive effect film 8 is first grown, after which, as shown in FIG. 3(B), photoresist 16 is formed in a stencil pattern.

Using the above-noted photoresist pattern as a mask, etching is done of the magnetoresistive effect film 8 by ion milling, after which a CoCrPt film 11 for application of vertical bias to the magnetoresistive effect film and Au film 12 for the purpose of causing current to flow in the magnetoresistive effect film 8 are sputtered, with leaving the photoresist pattern as it is, after which the photoresist 16 is lifted off.

The magnetoresistive effect film 8 is formed using an RF magnetron sputtering apparatus.

The argon gas pressure when forming the above-noted film is 0.3 Pa, and the RF power is 200 W. Because the photoresist is formed as a stencil, a two-layered resist is used. The first layer of the resist uses a PMGI film that is soluble in an alkaline developer, and the second layer thereof uses a Novolac type positive resist.

The accelerating potential used for ion milling of the magnetoresistive effect film is 500 V, and the ion current density is 1.0 $mA/cm^2$.

The sputtering of the CoCrPt film and the Au film were also done using an RF magnetron sputtering apparatus.

FIG. 3(B) shows the formation of the photoresist pattern 16 for establishing one side of the element height, this being formed as a two-layer resist, similar to the process shown in FIG. 3(A).

Figure 3C:
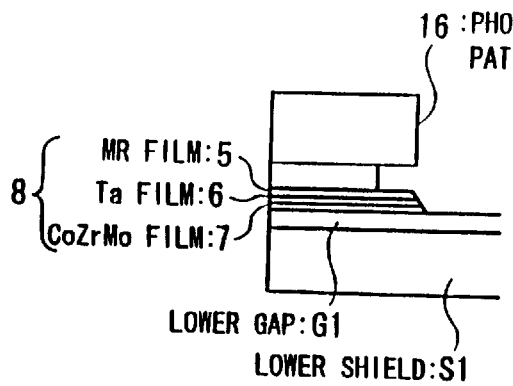

FIG. 3(C) shows a configuration formed after etching with ion milling method, the magnetoresistive effect film and the CoCrPt film and Au film formed on both ends of the magnetoresistive effect film, with using the photoresist pattern formed as shown in FIG. 3(B).

Figure 3D:
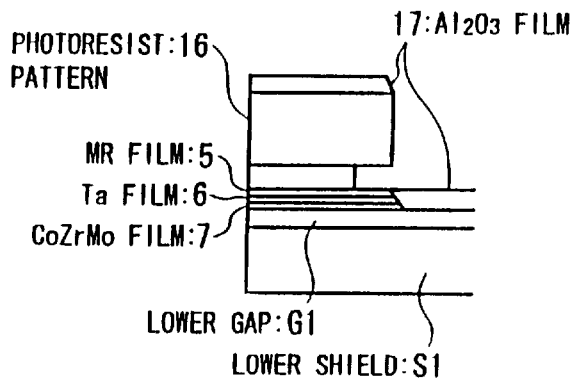

And FIG. 3(D) shows the condition after etching and after sputtering of an $Al_2O_3$ film 17 with the photoresist being left as it is.

Figure 3E:
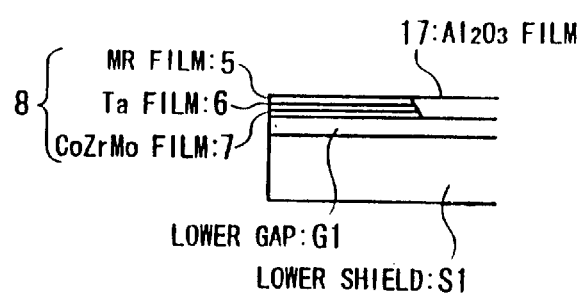

Further, FIG. 3(E) shows a configuration after the photoresist had been lifted-off.

The ion milling of FIG. 3(C) is performed with an accelerating potential of 500 V and an ion current density of 1.0 $mA/cm^2$.

The angle of incidence of the ion beam when milling is 0 degrees, and under these milling conditions approximately 6 minutes is required to etch the magnetoresistive effect element.

The cross-sectional shape of the magnetoresistive effect element after etching has a taper angle of approximately 60 degrees.

The formation of the $Al_2O_3$ film shown in FIG. 3(D) is done using an RF magnetron sputtering apparatus, with an argon gas pressure of 0.077 Pa and an RF power of 2 kW.

The thickness of the $Al_2O_3$ film 17 is the same as the thickness of the magnetoresistive effect element 8.

The lift-off shown in FIG. 3(E) is done using an organic solvent such as acetone in conjunction with an ultrasonic cleaner.

Upon measuring the shape after lift-off using a probe-type step profile measuring apparatus, it was seen that the step between the magnetoresistive effect element 8 and the $Al_2O_3$ film 17 was less than approximately 5 nm, thereby indicating that flattening had been achieved.

In this element, the $Al_2O_3$ film of the upper gap G2 was formed to a thickness of approximately 30 nm and the upper shield S2 was formed, after which an evaluation was performed of the insulation of the magnetoresistive effect element, from which it was seen that, it was a comparison to an element which had not been flattened, in which the insulation failure rate was approximately 50%, with an element that had been flattened, there was not a single insulation failure, thereby indicating that the flattening resulting in the maintenance of the insulation of the magnetoresistive effect element.

The same type of results occurred when using an $SiO_2$ film or an SiN film as the film formed in FIG. 3(D), and the same type of results were also obtained by using spin valve film as the magnetoresistive effect film.

In FIG. 2, S1 and S2 are the lower and upper magnetic shields, respectively, of an MR head. These are formed from an NeFe alloy (Permalloy), the thicknesses being 1 μm for the lower shield S1 and 3 μm for the upper shield S2.

Between the upper and lower shields is formed an MR head made up of a magnetoresistive effect element 8 serving as a magnetically sensitive part and end regions 9 and 10 having the function of supplying electric current and a vertical bias to the magnetoresistive effect element 8. The magnetoresistive effect element 8 is a laminate of a magnetization fixing layer, a magnetic spin layer, and a copper film therebetween.

The magnetization fixing layer is formed by laminating a anti-ferromagnetic PtMn film to 25 nm and a CoFe film to 4 nm on a base film of zirconium.

On the above laminate, a copper film having 2.7 nm in thickness is laminated, after which a CoFe film having 1 nm in thickness and an NiFe film 5 nm thick are laminated as a magnetic spin layer, and finally a Zr film having 3 nm in thickness is laminated on a surface of the magnetic spin layer, as a gap layer.

Each of these films is formed continuous using a DC magnetron sputtering apparatus. The total thickness of the spin valve film is approximately 40 nm.

The milling is performed under the same conditions as shown in FIG. 3(C).

The shape after milling has a taper angle of approximately 60 degrees, substantially the same as that of the NiFe film. The thickness of the $Al_2O_3$ film 17 formed by a sputtering process as shown in FIG. 3(D) is 40 nm, the same as the spin valve film.

After sputtering the $Al_2O_3$ film 17, lift-off is done using an organic solvent such as acetone, in conjunction with an ultrasonic cleaner, and measurement of the step between the magnetoresistive effect element 8 and the $Al_2O_3$ film 17 using a step profile measuring apparatus revealed that the step was reduced to approximately less than 4 nm.

After the above, the $Al_2O_3$ film of the upper gap G2 is formed to a thickness of 30 nm and the upper shield S2 is formed, after which an evaluation was performed of the insulation of the magnetoresistive effect element, from which it was seen that there was not even one insulation failure occurring in flattened elements, thereby indicating that flattening maintains the insulation properties.

The same type of results occurred when an $SiO_2$ film or SiN film was used as the-film formed as shown in FIG. 3(D).

Another embodiment of a compound magnetoresistive effect head according to the present invention is described in detail below, with reference to FIG. 4.

In FIG. 2, S1 and S2 are the lower and upper magnetic shields, respectively, of an MR head.

These shields are formed by an NiFe alloy (Permalloy), the film thicknesses being 1 $\mu$m and 3 $\mu$m for the lower and upper shields S1 and S2, respectively.

Between the upper and lower shields, is formed an MR element made up of a magnetoresistive effect element 8 serving as a magnetically sensitive part and end regions 9 and 10 having the function of supplying a vertical bias to the magnetoresistive effect element 8.

The magnetoresistive effect element 8 is formed by a magnetoresistive effect effect NiFe film 5 having a thickness of 10 nm, a CoZrMo film 7 having a thickness of 15 nm for the purpose of applying a vertical bias to the NiFe film 5, and a Ta film 6 having a thickness of 10 nm for the purpose of magnetically separating the NiFe film 5 and the CoZrMo film 7, these being laminated in the sequence of CoZrMo film 7, followed by the Ta film 6, and finally the NiFe film 5, from the side of the lower shield.

A width of the magnetoresistive effect element, corresponding to a width of track in the MR head, is 1.0 $\mu$m.

The end regions of the magnetoresistive effect element film are electrically joined to the magnetoresistive effect element 8, and are formed by a CoCrPt film 11 for applying vertical bias to the NiFe film 5 of the magnetoresistive effect element 8, and an Au film 12 for supplying a current to the magnetoresistive effect element 8.

The thickness of the CoCrPt film 11 is 25 nm.

The above-noted MR element formed by a magnetoresistive effect element 8 and end regions is electrically insulated from the upper and lower shields S1 and S2, by $Al_2O_3$ films 3 and 4, which are the lower gap G1 and upper gap G2, respectively. The thickness of the $Al_2O_3$ film is 50 nm for the lower gap G1 and 30 nm for the upper gap G2.

On the upper shield S2 is formed an NiFe magnetic pole P1, magnetically continuous with the upper shield S2 and well aligned with the magnetoresistive effect 8.

The magnetic pole P1 and upper shield S2 form one of the magnetic poles of the ID recording head, with the other magnetic pole P2 being formed by a NiFe film, with a magnetic gap 95 made by alumina, therebetween.

When this is done, the widths of both the magnetic pole P1 and the magnetic pole P2 are both 1.1 $\mu$m, the film thicknesses are 3.5 $\mu$m and 0.5 $\mu$m, respectively, and the film thickness of the magnetic gap G is 0.25 $\mu$m.

On the other hand, at a place which is 2 $\mu$m to the rear from the ABS surface of the magnetic poles P1 and P2, is formed a coil 90 of copper, insulated by photoresist, and by causing current to flow in this coil, a recording magnetic field is generated in the magnetic gap 95.

Another method for manufacturing the above-noted compound head 100 according to the present invention is described below, with reference being made to FIG. 4, which illustrates the manufacturing process steps as seen in a vertical cross-section view of the MR head.

FIG. 4(A) shows the magnetoresistive effect element 8 and the end electrode.

Although not shown in the drawing, the magnetoresistive effect element 8 is formed only on the track part of the MR head, with electrodes being formed so as to be connected to each end thereof.

To form this shape, a magnetoresistive effect film is first grown, after which, as shown in FIG. 4(B), photoresist 16 is formed in a stencil pattern.

Using the above-noted photoresist pattern as a mask, etching is done of the magnetoresistive effect film 8 by ion milling, after which a CoCrPt film 11 for application of vertical bias to the magnetoresistive effect film and Au film 12 for the purpose of causing current to flow in the magnetoresistive effect film 8 are sputtered with the photoresist pattern being remained, after which the photoresist is lifted off.

The magnetoresistive effect film 8 is formed using an RF magnetron sputtering apparatus.

The argon gas pressure when forming the above-noted film is 0.3 Pa, and the RF power is 200 W. Because the photoresist 16 is formed as a stencil, a two-layer resist is used.

The first layer of resist uses a PMGI film that is soluble in an alkaline developer, and the second layer uses a Novolac positive resist.

The accelerating potential used for ion milling of the magnetoresistive effect film 8 is 500 V, and the ion current density is 1.0 $mA/cm^2$. The sputtering of the CoCrPt film and the Au film was also done using an RF magnetron sputtering apparatus.

FIG. 4(B) shows the formation of the photoresist pattern 16 for establishing one side of the element height, this being formed as a two-layer resist, similar to the process shown in FIG. 4(A).

FIG. 4(C) shows the process of using the photoresist pattern formed as shown in FIG. 4(B) to etch, using ion milling, the magnetoresistive effect film and the CoCrPt film and Au film formed on the ends of the magnetoresistive effect film.

The ion milling of FIG. 4(C) is performed with an accelerating potential of 500 V and an ion current density of 1.0 mA/cm$^2$.

The angle of incidence of the ion beam when milling is 0 degrees. In FIG. 4(B), if a single-layer resist is used, milling is performed with a beam angle of incidence of 10 degrees, to prevent reattachment when milling.

The milling time is approximately 6 minutes at an incident angle of 0 degrees and, because the milling rate increase, approximately 5 minutes with an incidence angle of 10 degrees. The cross-sectional shape of the magnetoresistive effect element 8 after etching has a tape angle of approximately 60 degrees for an incidence angle of 0 degrees and approximately 65 degrees for an incidence angle of 10 degrees.

FIG. 3(D) shows the condition after etching, after which the photoresist is removed, and FIG. 4(E) shows the flattening of the magnetoresistive effect element 8 and the Al$_2$O$_3$ film 17 achieved by polishing the Al$_2$O$_3$ film 17 using chemical mechanical polishing (CMP).

The formation of the Al$_2$O$_3$ film shown in FIG. 4(D) is done using an RF magnetron sputtering apparatus, with an argon gas pressure of 0.077 Pa, and an RF power of 2 kW.

The thickness of the Al$_2$O$_3$ film is approximately 3 to 5 times the thickness of the magnetoresistive effect element 8.

After CMP, a measurement of the shape using a probe-type step profile measuring apparatus, from which it was seen that the step between the magnetoresistive effect element 8 and the Al$_2$O$_3$ film 17 was less than approximately 7 nm, thereby indicating that flattening had been achieved.

In this element, the Al$_2$O$_3$ film of the upper gap G2 is formed to a thickness of approximately 30 nm and the upper shield S2 is formed, after which an evaluation was performed of the insulation of the magnetoresistive effect element, from which it was seen that, it comparison to an element which had not been flattened, in which the insulation failure rate was approximately 50%, with an element that had been flattened, there was not a single insulation failure, thereby indicating that the flattening resulting in the maintenance of the insulation of the magnetoresistive effect element.

The same type of results are seen when using a spin valve film as the magnetoresistive effect film 8.

In FIG. 2, S1 and S2 are the lower and upper magnetic shields, respectively, of an MR head.

These are formed from an NeFe alloy (Permalloy), the thicknesses being 1 µm for the lower shield S1 and 3 µm for the upper shield S2.

Between the upper and lower shields is formed an MR element made up of a magnetoresistive effect element 8 serving as a magnetically sensitive part and end regions 9 and 10 having the function of supplying a vertical bias to the magnetoresistive effect element 8. The magnetoresistive effect element 8 is a laminate of a magnetization fixing layer, a magnetic spin layer, and a copper film therebetween.

The magnetization fixing layer is formed by laminating a anti-ferromagnetic PtMn film to 25 nm and a CoFe film to 4 nm on a base film of zirconium. Over this laminate, a copper film 2.7 nm thick is laminated, after which a CoFe film 1 nm thick and an NiFe film 5 nm thick are laminated as a magnetic spin layer, and finally a Zr film 3 nm is laminated as a gap layer.

The above-noted films are formed continuously using a DC magnetron sputtering apparatus.

The total thickness of the spin valve film is approximately 40 nm. The milling in FIG. 4(C) is performed under the same conditions. The shape after milling has a taper angle of approximately 60 degrees, substantially the same as the NiFe film. The thickness of the Al$_2$O$_3$ film formed as shown in FIG. 3(D) is approximately 3 to 5 times the thickness of the spin valve film.

After sputtering the Al$_2$O$_3$ film 17, CMP was used to polish the Al$_2$O$_3$ film 17 to the same thickness as the formed in FIG. 4(D), after which measurement of the step between the magnetoresistive effect element 8 and the Al$_2$O$_3$ film 17 was done using a step profile measuring apparatus, from which it was revealed that the step was reduced to approximately 6 nm or less.

After the above, the Al$_2$O$_3$ film of the upper gap G2 is formed to a thickness of 30 nm and the upper shield S2 is formed, after which an evaluation was performed of the insulation of the magnetoresistive effect element, from which it was seen that there was not even one insulation failure occurring in flattened elements, thereby indicating that flattening maintains the insulation properties.

As is clear from the foregoing embodiments, a method for manufacturing a compound magnetoresistive effect head according to the present invention adopts the basic technical constitution described below.

Specifically, the method of the present invention is one for manufacturing a compound magnetoresistive effect head having a dedicated playback head formed by opposing first and second magnetic shields, and a magnetoresistive effect element between the first and second magnetic shields with a first and second magnetic separation layer therebetween, and a dedicated recording head configured so as to use one of the two opposing magnetic shields as a first magnetic pole film, and, on the side of the first magnetic pole film opposite from the magnetoresistive effect element a coil held between an insulator and a second magnetic pole film, these being laminated in parallel with the first magnetic pole film, recording being performed by a magnetic field generated in a magnetic gap provided between the first and second magnetic pole films, wherein an electrode film for the purpose of causing a current to flow in a ferromagnetic film and magnetoresistive effect film for stabilizing magnetization of the magnetoresistive effect film are formed so as to be magnetically and electrically connected to both ends of the magnetoresistive effect film, this method of manufacturing having a first step of forming a first magnetic shield layer, a second step of forming a first magnetic separation layer on the first magnetic shield layer, a third step of forming a magnetoresistive effect film on the first magnetic separation layer, a fourth step of patterning the magnetoresistive effect element film to a prescribed shape, a fifth step of forming a flattening layer having a thickness substantially the same as the magnetoresistive effect element film on the first magnetic separation layer from which the magnetoresistive effect element film is removed, so as to join with the patterned magnetoresistive effect element film, and a sixth step of forming a second magnetic separation layer on the surface of the magnetoresistive effect element film and the flattening layer.

In the manufacturing method of the present invention, it is preferable that the fourth step be made up of forming photoresist on the magnetoresistive effect element film, and then patterning the photoresist, after which ion milling or reactive or chemical etching is used to etch the magnetoresistive effect element film.

In the manufacturing method of the present invention, it is preferable that, when etching the magnetoresistive effect element film, the end parts of the magnetoresistive effect element layer be formed with a prescribed angle.

It is additionally preferable in the manufacturing method of the present invention that the fifth step be made up of leaving the photoresist formed in the fourth step in place and forming a flattening layer.

It is desirable that a method for manufacturing a compound magnetoresistive effect head according to the present invention have a fourth step that is formed by a step of forming a first photoresist on the magnetoresistive effect element film, a step of forming a second photoresist on the first photoresist, and a step of exposing the first photoresist, and then performing developing of the first and second photoresists, so as to form a stencil pattern.

It is also desirable that formation of the photoresist in the fourth step be made up of forming photoresist on the magnetoresistive effect element film and then forming this into a stencil resist by exposure and developing conditions.

That is, it is possible to form a photoresist stencil using one type of photoresist, by appropriately selecting the etching conditions, and also possible, as noted above, to form a photoresist stencil as noted above, by using two or more photoresists that are laminated and etched.

In the method for manufacturing a compound magnetoresistive effect head according to the present invention it is preferable that fifth step is made up of a step of removing the photoresist used in the fourth step, a step of forming a flattening layer having a thickness that is greater than the magnetoresistive effect element layer on the surface of the magnetoresistive effect element film and the first magnetic separation layer, and a step of forming a flattened layer having a thickness substantially the same as the magnetoresistive effect element layer, by CMP polishing of the above-noted flattening layer.

It is desirable that the flattening layer used in the method for manufacturing according to the present invention includes at least one component selected from a group consisting of Al2O3, SiO2, and SiN.

By adopting the above-noted constitution, in a compound head formed by a dedicated MR playback head and an inductive recording head, a compound magnetoresistive head and method for manufacturing a compound magnetoresistive head according to the present invention flatten a step caused by patterning performed to establish the element thickness, thereby enabling the Al2O3 film between the magnetoresistive element and the magnetic shield to be made thin, enabling achievement of a compound head having a thin playback gap length.

What is claimed is:

1. A compound magnetoresistive effect head, comprising:
   a dedicated playback head, including
      opposing first and second magnetic shield films,
      a magnetoresistive effect element provided between said first and second magnetic shield films and through a first magnetic separation layer and second magnetic separation layer, each provided between said first magnetic shield film and said magnetoresistive effect element and between said second magnetic shield film and said magnetoresistive effect element, respectively; and
   a recording head configured so as to use one of the two opposing magnetic shield films as a first magnetic pole film, and, on a surface of said first magnetic pole film opposite to said magnetoresistive effect element, a coil sandwiched by insulators and a second magnetic pole film, these being laminated thereon, in parallel with said first magnetic pole film, recording being performed by a magnetic field generated in a magnetic gap provided between said first and second magnetic pole films,
      wherein in said compound magnetoresistive effect head, a ferromagnetic film for stabilizing magnetization of said magnetoresistive effect film and an electrode film causing a current to flow in a magnetoresistive effect film area arranged at both ends of said magnetoresistive effect film, so as to be magnetically and electrically connected thereto,
      wherein a flattening film is provided between said first and second magnetic separation films in a direction of a height of said magnetoresistive effect element of said playback head, and
      wherein a step at a joint portion formed between said flattening film and said magnetoresistive effect element is set at 30 nm or smaller.

2. A compound magnetoresistive effect head, comprising:
   a dedicated playback head, including
      opposing first and second magnetic shield films,
      a magnetoresistive effect element provided between said first and second magnetic shield films and through a first magnetic separation layer and second magnetic separation layer, each provided between said first magnetic shield film and said magnetoresistive effect element and between said second magnetic shield film and said magnetoresistive effect element, respectively; and
   a recording head configured so as to use one of the two opposing magnetic shield films as a first magnetic pole film, and, on a surface of said first magnetic pole film opposite to said magnetoresistive effect element, a coil sandwiched by insulators and a second magnetic pole film, these being laminated thereon, in parallel with said first magnetic pole film, recording being performed by a magnetic field generated in a magnetic gap provided between said first and second magnetic pole films,
      wherein in said compound magnetoresistive effect head, a flattening film is provided between said first and second magnetic separation films in a direction of a height of said magnetoresistive effect element of said playback head, and
      wherein a step at a joint portion formed between said flattening film and said magnetoresistive effect element is set at 30 nm or smaller.

* * * * *